(12) United States Patent
Shibukawa et al.

(10) Patent No.: US 8,408,254 B2
(45) Date of Patent: Apr. 2, 2013

(54) HYDROGEN FILLING APPARATUS

(75) Inventors: Koichi Shibukawa, Muroran (JP); Yukio Sato, Muroran (JP); Yoshinori Kawaharazaki, Muroran (JP); Yasuhiro Fujita, Muroran (JP); Shouichi Sato, Muroran (JP)

(73) Assignee: The Japan Steel Works, Ltd., Tokyo (JP)

( * ) Notice: Subject to any disclaimer, the term of this patent is extended or adjusted under 35 U.S.C. 154(b) by 755 days.

(21) Appl. No.: 12/525,691

(22) PCT Filed: Jan. 30, 2008

(86) PCT No.: PCT/JP2008/051429
§ 371 (c)(1),
(2), (4) Date: Aug. 4, 2009

(87) PCT Pub. No.: WO2008/096651
PCT Pub. Date: Aug. 14, 2008

(65) Prior Publication Data
US 2010/0012219 A1 Jan. 21, 2010

(30) Foreign Application Priority Data
Feb. 6, 2007 (JP) .................................. 2007-026998

(51) Int. Cl.
*B65B 1/20* (2006.01)
(52) U.S. Cl. ............... 141/82; 141/51; 141/95; 141/301
(58) Field of Classification Search .............. 141/51, 141/82, 83, 94, 95, 301, 285
See application file for complete search history.

(56) References Cited

U.S. PATENT DOCUMENTS

| 4,135,621 A | | 1/1979 | Turillon et al. |
| 5,609,191 A | * | 3/1997 | Topping et al. ............... 141/198 |
| 6,360,793 B1 | * | 3/2002 | Sugano et al. ............... 141/197 |

FOREIGN PATENT DOCUMENTS

| JP | 59-141401 A | 8/1984 |
| JP | 5-223012 A | 8/1993 |
| JP | 6-103987 A | 4/1994 |
| JP | 8-128597 A | 5/1996 |
| JP | 2000-128502 A | 5/2000 |
| JP | 2001-227699 A | 8/2001 |
| JP | 2002-269633 A | 9/2002 |

(Continued)

OTHER PUBLICATIONS

International Search Report of PCT/JP2008/051429 dated Mar. 25, 2008.

*Primary Examiner* — Gregory Huson
*Assistant Examiner* — Jason K Niesz
(74) *Attorney, Agent, or Firm* — Sughrue Mion, PLLC

(57) ABSTRACT

The invention comprises a hydrogen source, a detachable connecting port to which a hydrogen storage container is connected in order to store hydrogen supplied from the hydrogen source, a container cooling unit (an air blower) for cooling a hydrogen storage container connected to the connecting port, a container connection recognition unit (a limit switch, a controller) for recognizing connection of a hydrogen storage container to the connecting port, and a fill-up detection unit (a pressure transmitter, a hydrogen remaining sensor, a controller) for detecting that the hydrogen storage container connected to the connecting port is filled up with hydrogen. Consequently, it contributes to simple and safe hydrogen filling in the general public.

9 Claims, 4 Drawing Sheets

FOREIGN PATENT DOCUMENTS

| | | |
|---|---|---|
| JP | 2003-119586 A | 4/2003 |
| JP | 2003-130293 A | 5/2003 |
| JP | 2004-281107 A | 10/2004 |
| JP | 2006-258335 A | 9/2006 |

* cited by examiner

HYDROGEN FILLING APPARATUS

TECHNICAL FIELD

This invention relates to a hydrogen filling apparatus for filling a detachable hydrogen storage container with hydrogen.

BACKGROUND ART

In recent years, a fuel cell has received attention as a power source of a mobile phone, a laptop personal computer, etc. Since hydrogen is used as fuel of its fuel cell, a container for storing the hydrogen is required and a hydrogen filling apparatus for filling its container with the hydrogen is required. Also, it is sufficiently considered that a general household is used as a use place of the hydrogen filling apparatus with the widespread use of the fuel cell.

In this case, it is necessary that a general consumer can make safe and simple use in the household. Concretely, avoidance of a risk such as ignition by handling hydrogen, establishment of a proper cooling method of the case of a hydrogen storage container made of a hydrogen absorbing alloy, ensuring of simple operability capable of being handled even by the general consumer, etc. are required.

Several proposals have already been made in a method for filling a container with hydrogen.

For example, in Patent Literature 1, a filling pressure and a temperature of a hydrogen storage container are detected in detection of the amount of filling and based on T-P-C characteristics of a hydrogen absorbing alloy, the remaining amount of hydrogen is measured and a hydrogen filling ratio is obtained. Also, as cooling and risk prevention measures, the hydrogen storage container is placed in a low-temperature chamber and this low-temperature chamber may be a water bath, an ice bath and any low-temperature chamber as long as a temperature lower than ordinary temperature can be maintained.

In Patent Literature 2, detection of the amount of filling is detected by a filling pressure and a temperature of a hydrogen storage container and a hydrogen supply amount is controlled by a valve so as to fill up based on PCT characteristics of a hydrogen absorbing alloy. Also, as cooling and risk prevention measures, the hydrogen storage container is cooled by a low-temperature bath using a refrigerant.

In Patent Literature 3, a method in which hydrogen is generated using a polyelectrolyte water electrolysis device and a fill-up is detected by detecting a hydrogen pressure in detection of the amount of filling and filling of hydrogen is once stopped at a point in time when a filling pressure of hydrogen reaches a certain degree of value and a hydrogen filling ratio is decided by a decrease rate of the hydrogen pressure of the subsequent supply buffer tank and refilling is performed when necessary is adopted. Also, as cooling and risk prevention measures, cooling is performed using a cooling part into which a tubular evaporator and a refrigerator dedicated to cooling are incorporated and also as leakage hydrogen measures, hydrogen is induced using a dedicated fan etc. and combustion processing is performed by a leakage hydrogen processing part.

In Patent Literature 4, an apparatus for filling a hydrogen storage container with hydrogen generated from a water electrolysis device is proposed. This apparatus is constructed so as to fill directly while suppressing variations in pressure of the water electrolysis device by disposing a buffer tank or a flow rate regulating valve between the water electrolysis device and a filling device.

Patent Literature 1: JP-A-6-103987
Patent Literature 2: JP-A-8-128597
Patent Literature 3: JP-A-2002-269633
Patent Literature 4: JP-A-2003-119586

DISCLOSURE OF THE INVENTION

Problems that the Invention is to Solve

However, in the related proposed arts described above, design careful that a general consumer can make safe and simple use in a household is not done and a practical hydrogen filling apparatus capable of being used in such a household has not been developed yet.

Further, with simple operability, it is necessary to detect a hydrogen filling ratio of the inside of a hydrogen storage container for automation of an operation stop or display of a filling state in the case of filling the hydrogen storage container with hydrogen by a hydrogen filling apparatus in order to know a hydrogen filling amount of the hydrogen storage container and also automatically operate the apparatus, but an art of detecting a hydrogen absorption amount of a hydrogen absorbing alloy is not established.

The invention has been implemented based on the circumstances described above, and an object of the invention is to provide a hydrogen filling apparatus in which a general consumer without having special knowledge can fill a hydrogen storage container with hydrogen safely and simply.

Moreover, a further object is to provide a hydrogen filling apparatus capable of establishing an art of detecting a hydrogen filling ratio inside a hydrogen storage container with accuracy having no problem in use and simplicity and displaying a filling state in the apparatus or automatically stopping an operation at the time of a fill-up.

Means for Solving the Problems

That is, a hydrogen filling apparatus of the invention is characterized by comprising a hydrogen source, a detachable connecting port to which a hydrogen storage container is connected to store hydrogen supplied from the hydrogen source, a container cooling unit for cooling a hydrogen storage container connected to the connecting port, a container connection recognition unit for recognizing connection of a hydrogen storage container to the connecting port, and a fill-up detection unit for detecting that the hydrogen storage container connected to the connecting port is filled up with hydrogen.

Also, the hydrogen filling apparatus of the invention further comprises a hydrogen filling control unit for supplying and filling the hydrogen storage container with hydrogen from the hydrogen source after recognition of the connection by the connection recognition unit and completing supply and for filling with the hydrogen according to fill-up detection by the fill-up detection unit.

Also, in the hydrogen filling apparatus of the invention, the hydrogen filling control unit controls the container cooling unit to cool a hydrogen storage container supplied and filled with hydrogen.

Also, the hydrogen filling apparatus of the invention further comprises an apparatus cover with which at least the connecting port is covered, the apparatus cover in which an air introduction port is disposed in a low position and an air discharge port is disposed in a high position and also the connecting port can be arranged proximately in an air path ranging from an air introduction port to an air discharge port, and an air introduction machine for forcedly introducing air into the air introduction port.

Also, in the hydrogen filling apparatus of the invention, a hydrogen storage container connected to the connecting port is arrangeable in the air path such that the hydrogen storage container can be cooled by air flowing through the air path.

Also, in the hydrogen filling apparatus of the invention, the fill-up detection unit detects a flow rate or a pressure or both of the flow rate and the pressure of hydrogen with which the hydrogen storage container is supplied and filled and calculates a hydrogen filling ratio of the inside of the container based on the detection result.

Also, in the hydrogen filling apparatus of the invention, the fill-up detection unit detects a fill-up based on a detection result of a hydrogen remaining sensor for detecting the remaining amount of hydrogen of the inside of the hydrogen storage container.

Also, in the hydrogen filling apparatus of the invention, the container cooling unit comprises a cooling tube in which a refrigerant flows and heat exchange with the hydrogen storage container is conducted.

Also, the hydrogen filling apparatus of the invention further comprises a hydrogen tank in the hydrogen source, and a Peltier device for cooling the hydrogen storage container by the heat absorption side and heating the hydrogen tank by the heat dissipation side in the case of supplying hydrogen from the hydrogen tank.

Also, in the hydrogen filling apparatus of the invention, a charging hole for charging the hydrogen storage container is disposed in an apparatus body comprising the connecting port, and the charging hole has a shape in which the periphery of the hydrogen-storage container is surrounded through a small gap and an outer peripheral surface of the hydrogen storage container and an inner peripheral surface of the charging hole have concave and convex shapes for positioning in which any one of the peripheral surfaces or the respective peripheral surfaces engage mutually and the hydrogen storage container is positioned so as to have a small gap between the charging hole and the hydrogen storage container over substantially the whole periphery.

That is, according to the invention, container connection recognition unit recognizes that a hydrogen storage container is connected to a connecting port, and this hydrogen storage container is filled with hydrogen and thereby, false discharge of hydrogen from the connecting port is prevented. Also, this recognition facilitates automation of filling with hydrogen more.

During filling with hydrogen, the hydrogen storage container is cooled by container cooling unit and a risk by overheat of the hydrogen storage container can be eliminated. Also, in the case of using a hydrogen absorbing alloy in the hydrogen storage container, when the hydrogen storage container starts to be filled with hydrogen, a temperature starts to rise by characteristics of the hydrogen absorbing alloy, so that the hydrogen storage container is cooled by the cooling unit and thereby, absorption efficiency of hydrogen, that is, filling efficiency improves.

Also, in the case of supplying and filling the hydrogen storage container with hydrogen, a fill-up is detected by fill-up detection unit, so that supply and filling with hydrogen are stopped according to this detection and thereby, excess supply with hydrogen can be prevented to enhance safety.

A hydrogen source of the invention could be a hydrogen source capable of supplying hydrogen, and is not limited to a particular hydrogen source, and a high-pressure hydrogen tank, a hydrogen absorbing alloy container, etc. are given and in addition, a hydrogen generator such as a water electrolysis device or a reformer using gas capable of production always without the need for keeping is given preferably. Moreover, in addition to the hydrogen source, it can be constructed so that a hydrogen storage part for once storing hydrogen is disposed and a hydrogen storage container is filled with hydrogen from the hydrogen storage part. A hydrogen storage tank, a hydrogen absorbing alloy container, etc. can be used in the hydrogen storage part. The hydrogen can be supplied to a hydrogen storage container at a stable pressure by interposing the hydrogen storage part.

Also, as a connecting port to which a hydrogen storage container is connected, a connecting port capable of supplying hydrogen to the hydrogen storage container with the smallest leakage and also attaching and detaching the hydrogen storage container easily is desirable and a known coupler etc. can be used. However, the connecting port is not limited to a particular structure as the invention. As the hydrogen storage container, a container filled with high-pressure hydrogen as it is, a container in which a hydrogen absorbing alloy is received and hydrogen is absorbed and stored in the hydrogen absorbing alloy, etc. can be used. In brief, the hydrogen storage container could be a container in which hydrogen can be stored and supplied to the outside use side and is not limited to a particular structure as the invention. Any unit capable of recognizing connection of a hydrogen storage container to the connecting port distinctly from a state of disconnection, and a limit switch etc. can be used as the container connection recognition unit, and the container connection recognition unit is not limited to particular means as the invention.

Also, as the fill-up detection unit, for example, means for detecting a fill-up by detecting a flow rate or a pressure or both of the flow rate and the pressure of hydrogen with which the hydrogen storage container is supplied and filled and calculating a hydrogen filling ratio of the inside of the container or means for detecting a fill-up by detecting the remaining amount of hydrogen of the inside of a hydrogen storage container is given.

For example, one or both of a flow rate and a pressure of hydrogen flowing from a hydrogen source to a hydrogen storage container are detected by at least one or both of a flow rate detector and a pressure detector of hydrogen in filling and its value is computed by a sequential processor and is collated with typical characteristics of a hydrogen absorbing alloy and thereby, a hydrogen filling ratio of the inside of the hydrogen storage container is calculated. Also, the remaining amount of hydrogen can be detected by a hydrogen remaining sensor arranged inside a hydrogen storage container. As the hydrogen remaining sensor, a known sensor can be used and also in addition to this, a hydrogen remaining sensor in which the sensor is filled with a hydrogen absorbing alloy for sensor and a sensor body with a container shape capable of inside and outside movement of hydrogen is provided and the sensor body partially has an easy-strain part in which strain easily occurs with absorption and desorption of hydrogen of the hydrogen absorbing alloy for sensor and a strain gauge for measuring strain of the easy-strain part is disposed can be used.

It is desirable that a user can grasp the hydrogen filling ratio by a notification unit such as display by changes in lighting, blinking, lights-out, etc. of a lamp merely by a single or plural ranks or a numerical value.

Calculation of the hydrogen filling ratio or detection of a fill-up can be performed by a CPU and a program for operating this CPU. It can be constructed so as to automatically stop an operation of an apparatus in the case of detecting completion of hydrogen filling.

In a step ranging from container connection recognition by the container connection recognition unit to fill-up detection by the fill-up detection unit, supply and filling with hydrogen are controlled by hydrogen filling control unit and a sequence of hydrogen filling can be automated. In the hydrogen filling control unit, filling with hydrogen can be started using the container connection recognition as a trigger and also by a manual start etc. by a user who checks the container connection. The filling can be started by manipulation of a valve of a hydrogen supply path or a high-pressure hydrogen tank, heating of a hydrogen storage tank using a hydrogen absorbing alloy, energization of an electrode in a water electrolysis device, etc. In the hydrogen supply path ranging from a hydrogen source to a connecting port, hydrogen supply can be controlled further by manipulation of a flow rate control valve or an on-off valve. An apparatus can be automatically stopped at the time of a fill-up by the fill-up detection unit.

The hydrogen filling control unit can be constructed by, for example, a CPU and a program for operating this CPU, and may be shared with the fill-up detection unit described above.

Also, a related art does not have a mechanism for effectively removing heat generation associated with hydrogen absorption of a hydrogen storage material, so that there is a problem that a temperature of a hydrogen storage container rises with progress of filling and the hydrogen absorption is inhibited and thereby filling time becomes long. Also, this means that a filling hydrogen flow rate reduces than a rating and thereby ability of a hydrogen (supply) source cannot be exercised sufficiently, and there is also a problem in an aspect of effective use of a device. Therefore, when hydrogen is absorbed in a hydrogen absorbing alloy, generated heat is drawn, so that a filling apparatus requires some cooling mechanism.

Therefore, the hydrogen storage container is cooled by a container cooling unit during storage of hydrogen. It is desirable that cooling by this container cooling unit be also controlled together with hydrogen filling by the hydrogen filling control unit described above in order to be efficiently filled with hydrogen. That is, adjustment etc. of cooling power can be made according to a change in a heating value with progress of hydrogen filling or a start of container cooling with a start of filling.

The cooling can be performed using air blowing or a cooling tube, etc. arranged in the periphery of a hydrogen storage container. Concretely, a cooler is disposed inside a cabinet of a hydrogen generator and thereby, water, antifreeze or air is cooled as a cooling medium and the cooled cooling medium is circulated to a heat exchanger or the cooling tube touched to a surface of a hydrogen storage container by the cooling tube etc. and heat of the hydrogen storage container is drawn and the cooling is performed. In the case of mounting the hydrogen storage container in a hydrogen filling apparatus at this time, the cooling tube or the heat exchanger can be installed in the hydrogen filling apparatus so as to touch this cooling tube or the heat exchanger to a side surface of the hydrogen storage container.

Also, in the case of cooling by air blowing, a charging hole having a shape in which the periphery of the hydrogen storage container is surrounded through a small gap is disposed in an apparatus body comprising the connecting port and further in an outer peripheral surface of the hydrogen storage container and an inner peripheral surface of the charging hole, concave and convex shapes for positioning in which any one of the peripheral surfaces or the respective peripheral surfaces engage mutually and the hydrogen storage container is positioned so as to have a small gap between the charging hole and the hydrogen storage container over substantially the whole periphery can be disposed. By the configuration, a flow gap of cooled air is ensured between the outer peripheral surface of the hydrogen storage container and the inner surface of the charging hole, and cooling performance of the container improves. Also, by decreasing a touched surface of the hydrogen storage container and the charging hole, a manufacturing error of the mutual components can be absorbed. In addition, in the concave and convex for positioning, shapes of having a concave part and a convex part in any of a hydrogen storage container and an accommodation hole between the hydrogen storage container and the accommodation hole are not limited, and there could be relations in which a convex part is disposed in any one of the hydrogen storage container and the accommodation hole or a concave part is disposed in one of them and a convex part is disposed in the other. Also, a convex shape may be a shape given by sticking another substance.

As a concrete example of other cooling methods, a Peltier device (or a Peltier element) may be used. In the case of mounting a hydrogen storage container in a hydrogen filling device, the Peltier device is installed in the hydrogen filling device so as to touch the cooling side of this Peltier device to a side surface of the hydrogen storage container. Then, by applying a necessary voltage to the Peltier device, heat of the hydrogen storage container is drawn and cooling is performed. At this time, for example, when a hydrogen supply side buffer tank is present in a hydrogen generator and a hydrogen absorbing alloy is used in its buffer tank, the heating side of the Peltier device may be used in heating of this buffer tank.

In addition, when arrangement of the Peltier device, the heat exchanger, the cooling tube or a mechanism of air blowing interferes in the case of attaching and detaching the hydrogen storage container to and from a connecting port, it may be constructed so that when these component substances are attached and detached, the component substances are retracted and after attachment and detachment, these component substances are moved in a predetermined place automatically or manually. For example, a mechanism capable of movement automatically or manually so as to touch a cooling part to a side surface of the hydrogen storage container is disposed.

In the case of filling a hydrogen storage container with hydrogen by a hydrogen filling apparatus, a connecting port such as a coupler is required in an attachment and detachment part for connecting a hydrogen supply line to the hydrogen storage container, but the connecting port has a possibility that some hydrogen leaks in the case of attachment and detachment, and this cannot be avoided technically at present. Also, when a sealing material of the connecting port deteriorates due to a change etc. with time, a tendency for the leak amount of hydrogen to become large can be estimated. When this leak hydrogen enters the inside of the apparatus and remains, there is a risk of ignition due to sparks etc. struck by an electrical device of the inside of the apparatus. It is desirable to take measures to avoid this risk in the case of providing the hydrogen filling apparatus.

As a configuration suitable to avoid the risk described above, an apparatus cover with which at least the connecting port is covered is disposed and an air introduction port is disposed in a low position of this apparatus cover and an air discharge port is disposed in a high position and the connecting port is constructed so as to be positioned proximately in an air path or inside the air path ranging from an air introduction port to an air discharge port. As an air introduction machine for forcedly introducing air into the air introduction port, for example, an air blower for blowing air into the air introduction port or an aspirator for aspirating air from the air discharge port can be used. Desirably, this air introduction machine operates by supplying necessary electric power and air is continuously introduced from the air introduction port to the inside of the filling apparatus and the inside of the filling apparatus is set in a state of air blowing slightly pressurized always. In the air path, airflows from above to below as a whole, so that even if hydrogen should leak in the periphery of the connecting port, the hydrogen with the nature of ascending in the atmosphere and lighter than air moves easily through the air path together with this air and is dissipated from the air discharge port and thereby, the risk is avoided. The air discharge port is desirably arranged upward so that air can be upward dissipated surely. Since a concentration of hydrogen dissipated from the air discharge port becomes remarkably low, the risk of ignition etc. is eliminated. Also, there is little fear that this dissipated hydrogen is again introduced from a hydrogen introduction port with a low position to the inside of the apparatus. Further, when the air path is constructed along a surface of a hydrogen storage container connected to the connecting port, the hydrogen storage container is simultaneously cooled by air flowing through the air path, and cooling of the container and risk avoidance are simultaneously achieved.

Consequently, there is no situation in which leak hydrogen caused in an attachment and detachment part enters the inside of the filling apparatus and remains at the time of attaching and detaching the hydrogen storage container, so that the risk of ignition due to sparks etc. struck by an electrical device is avoided.

Also, the discharge port of this introduced air is shared with the charging hole of the hydrogen storage container and a gap between both side surfaces of the hydrogen storage container and a wall of the air discharge port of the filling apparatus at the time of mounting the hydrogen storage container in the filling apparatus is moderately maintained and thereby, it can be constructed so that air flows in this gap. In this case, it may be constructed so as to form a groove structure along a flow of air in a surface of the hydrogen storage container. As a result of this, a flow of discharged air is guided along a side surface of the hydrogen storage container and heat generated at the time of hydrogen absorption of a hydrogen absorbing alloy can be drawn by this air flow. This groove structure can also provide a positioning function of the hydrogen storage container.

By the above, a rational method capable of satisfying both two functions of cooling of the hydrogen storage container and avoidance of a risk of ignition is obtained by one mechanism.

It is necessary to satisfy requirements about cooling of the hydrogen storage container and avoidance of a risk of ignition by the simplest possible method in order to achieve miniaturization or cost reduction of the filling apparatus. According to the form described above, cooling means and effective ignition prevention of the hydrogen storage container are shared and ensuring of safety and reduction in hydrogen filling time can be achieved and it is advantageous in miniaturization and cost reduction.

By the air blowing form described above, problem-free filling (cooling) performance can be obtained in filling of a hydrogen storage container with hydrogen in general use, but the case of desiring a shorter time of filling of the hydrogen storage container with hydrogen is considered depending on use. In this case, the cooler as described above may be disposed as another mechanism in order to enhance cooling power.

Advantage of the Invention

According to a hydrogen filling apparatus of the invention as described above, the hydrogen filling apparatus comprises a hydrogen source, a detachable connecting port to which a hydrogen storage container is connected in order to store hydrogen supplied from the hydrogen source, a container cooling unit for cooling a hydrogen storage container connected to the connecting port, a container connection recognition unit for recognizing connection of a hydrogen storage container to the connecting port, and a fill-up detection unit for detecting that the hydrogen storage container connected to the connecting port is filled up with hydrogen, so that the hydrogen storage container can be filled with hydrogen while effectively cooling the hydrogen storage container during hydrogen filling by a simple method and an effect of reducing hydrogen filling time can be obtained. Also, a risk of hydrogen leakage by a situation in which the hydrogen storage container is not connected to the connecting port can be avoided. Also, detection at the time of a fill-up can be performed, so that a series of filling sequence can be automated by an automatic stop etc. of filling and an effect capable of doing hydrogen filling work without resistance to a general consumer can also be obtained.

Also, when the invention has an apparatus cover with which at least the connecting port is covered, the apparatus cover in which an air introduction port is disposed in a low position and an air discharge port is disposed in a high position and also the connecting port can be arranged in an air path ranging from an air introduction port to an air discharge port, and comprises an air introduction machine for forcedly introducing air into the air introduction port, a risk of ignition or a bad influence on an electrical component by leak hydrogen is avoided by a simple method and at the same time, the hydrogen storage container can be cooled effectively during hydrogen filling, and the effect of further reducing the hydrogen filling time can be obtained.

DESCRIPTION OF REFERENCE NUMERALS AND SIGNS

2 WATER ELECTROLYSIS DEVICE
5 HYDROGEN SUPPLY LINE
8 CONNECTING PORT
9 LIMIT SWITCH
10 HYDROGEN STORAGE CONTAINER
10a GROOVE
13b CONVEX PART FOR POSITIONING
11 AIR BLOWER
14a AIR INTRODUCTION PORT
14b AIR PATH
14c AIR PATH
14d AIR PATH
14e AIR DISCHARGE PORT
13 DOCK
20 CONTROLLER
21 MANIPULATION AND DISPLAY PART
40 HYDROGEN STORAGE TANK FOR SUPPLY
42 HEATER

43 HYDROGEN SUPPLY LINE
48 CONNECTING PORT
50 PELTIER DEVICE
60 HIGH-PRESSURE CYLINDER
61 HYDROGEN GENERATOR
62 HYDROGEN SUPPLY LINE
67 CONNECTING PORT
68 HYDROGEN STORAGE TANK FOR BUFFER

BEST MODE FOR CARRYING OUT THE INVENTION (First Embodiment)

Figure 1:
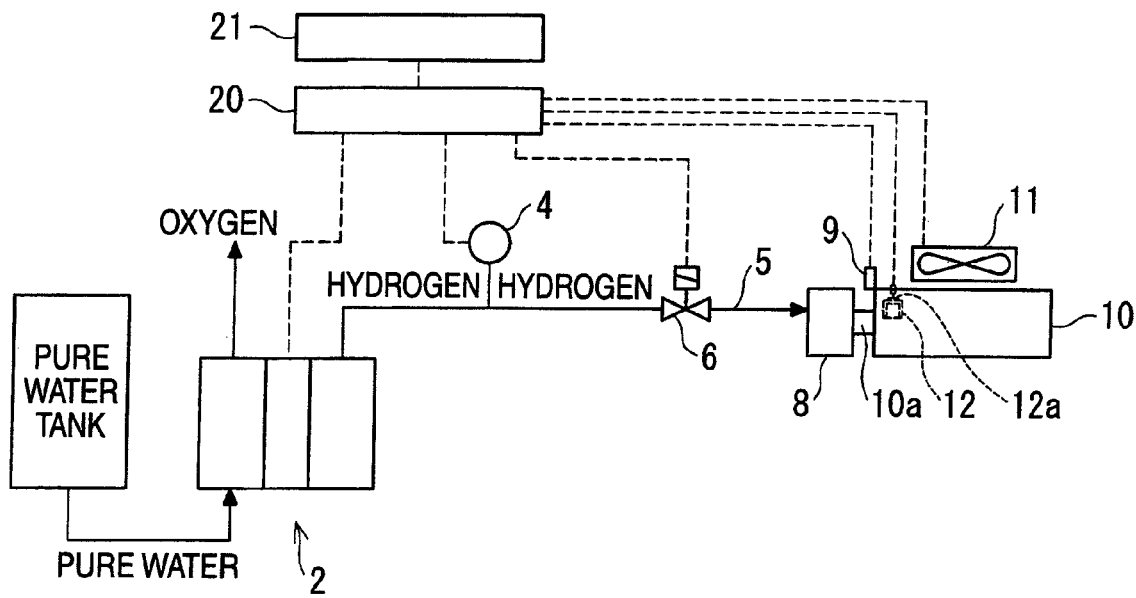
[FIG. 1] A diagram showing an outline of a hydrogen filling apparatus of one embodiment of the invention.

One embodiment of the invention will hereinafter be described based on FIGS. 1 to 3.

The present apparatus has a water electrolysis device 2 in which control is performed by a controller 20, and the controller 20 is constructed using a CPU and a program for controlling this CPU as main components, and corresponds to a hydrogen filling control unit of the invention. Also, a manipulation and display part 21 is connected to the controller 20, and necessary instructions can be sent to the controller 20 through the manipulation and display part 21 or various information can be displayed on the manipulation and display part 21 by control of the controller 20.

A hydrogen supply line 5 is connected to the water electrolysis device 2. A pressure transmitter 4 is connected to the hydrogen supply line 5, and pressure detection data of the inside of the hydrogen supply line 5 detected by the pressure transmitter 4 is transmitted to the controller 20 described above. In the controller 20, a hydrogen filling apparatus can be controlled based on hydrogen pressure information obtained from the pressure transmitter 4 and a fill-up of a hydrogen storage container can be detected based on the pressure variations. Therefore, the pressure transmitter 4 and the controller 20 cooperatively construct a fill-up detection unit.

The downstream end of the hydrogen supply line 5 is connected to a container connecting port 8 via the branch part. The container connecting port 8 is constructed in a female shape and a male-shaped coupler 10a disposed in a hydrogen storage container 10 can be attached and detached. A hydrogen absorbing alloy is received in the hydrogen storage container 10 and hydrogen is stored and desorbed by hydrogen absorption and desorption of the hydrogen absorbing alloy. Also, a hydrogen sensor 12 is built into the hydrogen storage container 10. The hydrogen sensor 12 has a cross-sectional U shape in which one side wall of a quadrilateral tube-shaped sensor body is notched, and the inside of the quadrilateral tube is filled with the hydrogen absorbing alloy for sensor. A tube wall opposed to the notch is formed in an easy-strain part in which stress concentrates in the case of deforming the sensor body using the notched side as the open end, and a strain gauge 12a is stuck on this easy-strain part. It is constructed so that an output of the strain gauge 12a can be fetched to the outside of the hydrogen storage container 10 by the output end (not shown) and the output end of a strain sensor is connected to the controller 20 in the case of connecting the hydrogen storage container 10 to the container connecting port 8. The output of the strain gauge 12a is transmitted to the controller 20, with the result that the remaining amount of hydrogen of the inside of the hydrogen storage container 10 can be detected based on the output of the strain gauge 12a.

Also, a limit switch 9 for detecting the hydrogen storage container 10 connected to the container connecting port 8 is arranged in the vicinity of the container connecting port 8 and an output of the limit switch 9 is outputted to the controller 20. Consequently, when the hydrogen storage container 10 is connected to the container connecting port 8, the limit switch 9 operates and its output is outputted to the controller 20 and container connection is recognized. That is, the limit switch 9 and the controller 20 cooperatively construct a container connection recognition unit.

Figure 2:
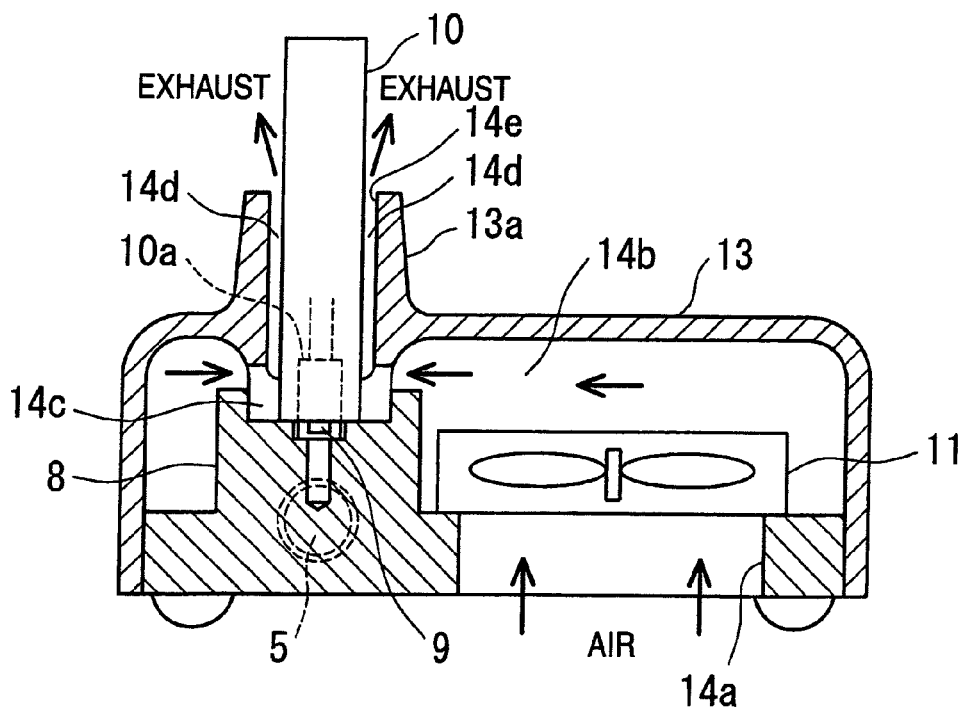
[FIG. 2] A sectional view enlarging a part of a configuration of the hydrogen filling apparatus of one embodiment of the invention.

In addition, as shown in FIG. 2, the periphery of the container connecting port 8 is upward arranged inside a dock 13 as an apparatus cover included in an apparatus body and in the upper portion of the container connecting port 8, a dock tube part 13a by which the periphery of the cylindrical hydrogen storage container 10 connected to the container connecting port 8 is surrounded through a small gap is upward disposed and a tube hole of the dock tube part 13a corresponds to a charging hole of the invention. In the dock 13, an air introduction port 14a is disposed in a lower end surface and a cavity is had in the inside and an upper end opening of the dock tube part 13a is formed in an air discharge port 14e and the periphery is covered with a dock wall. Also, in the vicinity of the air introduction port 14a, an air blower 11 for blowing air from the outside to the inside of the dock 13 is arranged as an air introduction machine. As a result of this, air paths 14b, 14c, 14d formed upward as a whole are constructed in a cavity ranging from the air introduction port 14a to the air discharge port 14e. The air path 14c is formed in the top side periphery of the hydrogen storage container 10 connected to the connecting port 8, and the air path 14d is constructed by a gap between the hydrogen storage container 10 and the dock tube part 13a.

Figure 3:
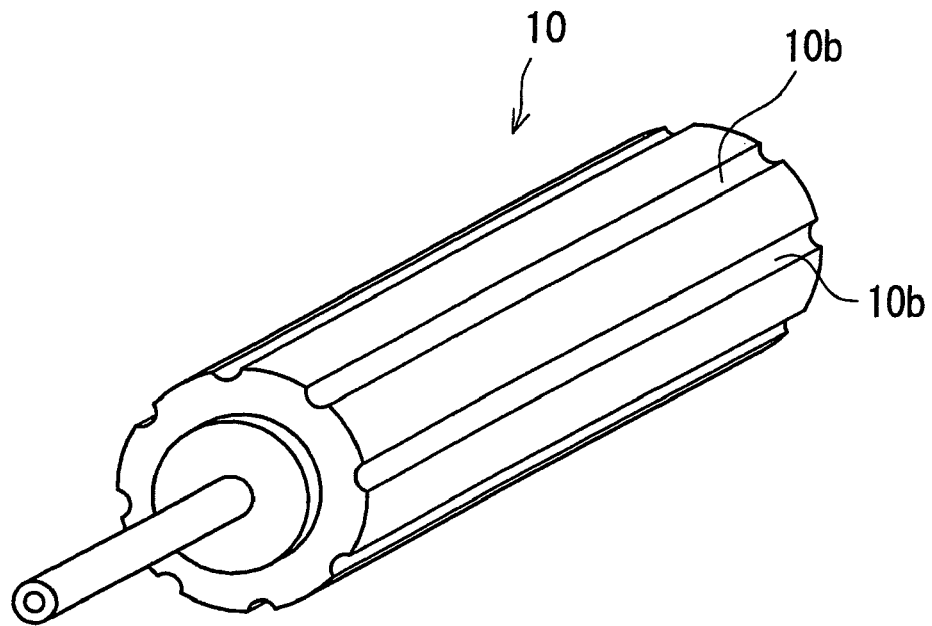
[FIG. 3] A perspective view of a hydrogen storage container of one embodiment of the invention and a plan view showing the hydrogen storage container in a connected state.
Figure 3:
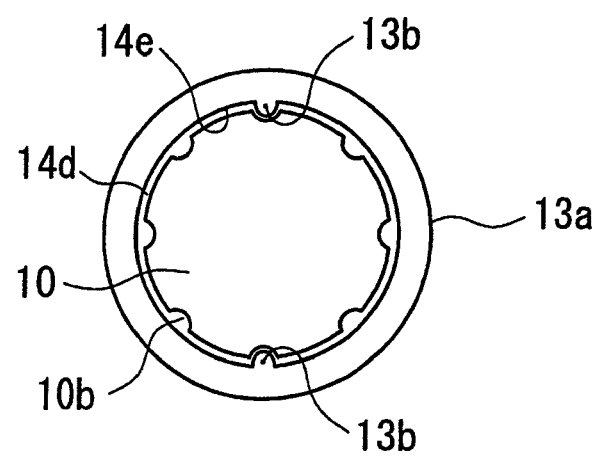

Also, as shown in FIG. 3, in the hydrogen storage container 10, plural grooves 10b along a shaft direction are formed in an outer peripheral surface at a predetermined spacing as concave parts for positioning, and convex parts 13b for positioning disposed in an inner peripheral surface of the dock tube part 13a are fitted into a part of the grooves 10b and the hydrogen storage container 10 is positioned so as to ensure a predetermined gap between the tube hole and the hydrogen storage container 10 over substantially the whole periphery. By the configuration described above, the hydrogen filling apparatus is constructed. In addition, it is unnecessary for the convex parts 13b for positioning to extend along a shaft direction and plural convex parts 13b for positioning may be disposed at a predetermined spacing in the shaft direction.

Next, action of the hydrogen filling apparatus will be described.

When a hydrogen gas generated by the water electrolysis device 2 reaches a certain value or more, water electrolysis is stopped and the hydrogen gas becomes a standby state. The air blower 11 starts driving along with power-on. When the hydrogen storage container 10 is connected to the container connecting port 8, driving of opening of an electromagnetic valve 6 for filling is started while entering a filling mode in the controller 20 by operation of the limit switch 9. When a filling pressure detected by the pressure transmitter 4 reaches a certain value or less, in the controller 20, the water electrolysis device 2 is again operated and hydrogen supply is started.

Inside the dock 13, air is blown from the air introduction port 14a to the discharge port 14e through the air path 14b, the air path 14c of the top periphery of the connecting port 8 and the air path 14d of a gap between the hydrogen storage container 10 and an inner peripheral surface of the dock tube part 13a by operation of the air blower 11 described above. As a result of this, air of the inside of the apparatus and hydrogen leaking from the container connecting port 8 etc. unexpectedly are dissipated from the air discharge port 14e through the air paths 14b to 14d described above. In this case, the hydrogen with small specific gravity is safely dissipated to the outside of the apparatus through the air paths moving upward as a whole.

In addition, it is desirable to make the dock tube part 13a as high as possible to the extent to which the dock tube part 13a does not obstruct attachment and detachment of the hydrogen storage container 10. Consequently, a difference between the air introduction port 14a and the air discharge port 14e in height can be increased more. Also, a flow of discharged air is prevented from moving away from a side surface of the hydrogen storage container 10 and the flow of air can be brought into contact with the largest possible area of the side surface of the hydrogen storage container 10, so that cooling is ensured more. In this flow of air, the grooves 10b formed in an outer surface of the hydrogen storage container 10 form an air gap for cooling and the air flows smoothly and also a surface area of the outer surface increases and the outer surface of the hydrogen storage container 10 is cooled effectively.

In the case where hydrogen filling reaches a final phase and a value detected by the hydrogen remaining sensor 12 exceeds a set value or the case where a filling pressure detected by the pressure transmitter 4 exceeds a certain value, the water electrolysis device 2 is temporarily stopped. Hydrogen supply is repeated in the case where a pressure drops again. In the case where a filling speed of hydrogen falls below a certain amount or the case where a pressure drop speed falls below a certain amount, the controller 20 considers that hydrogen filling is completed, and the electromagnetic valve 6 for filling is closed and the effect that the filling is completed is displayed on the manipulation and display part 21.

(Second Embodiment)

Figure 4:
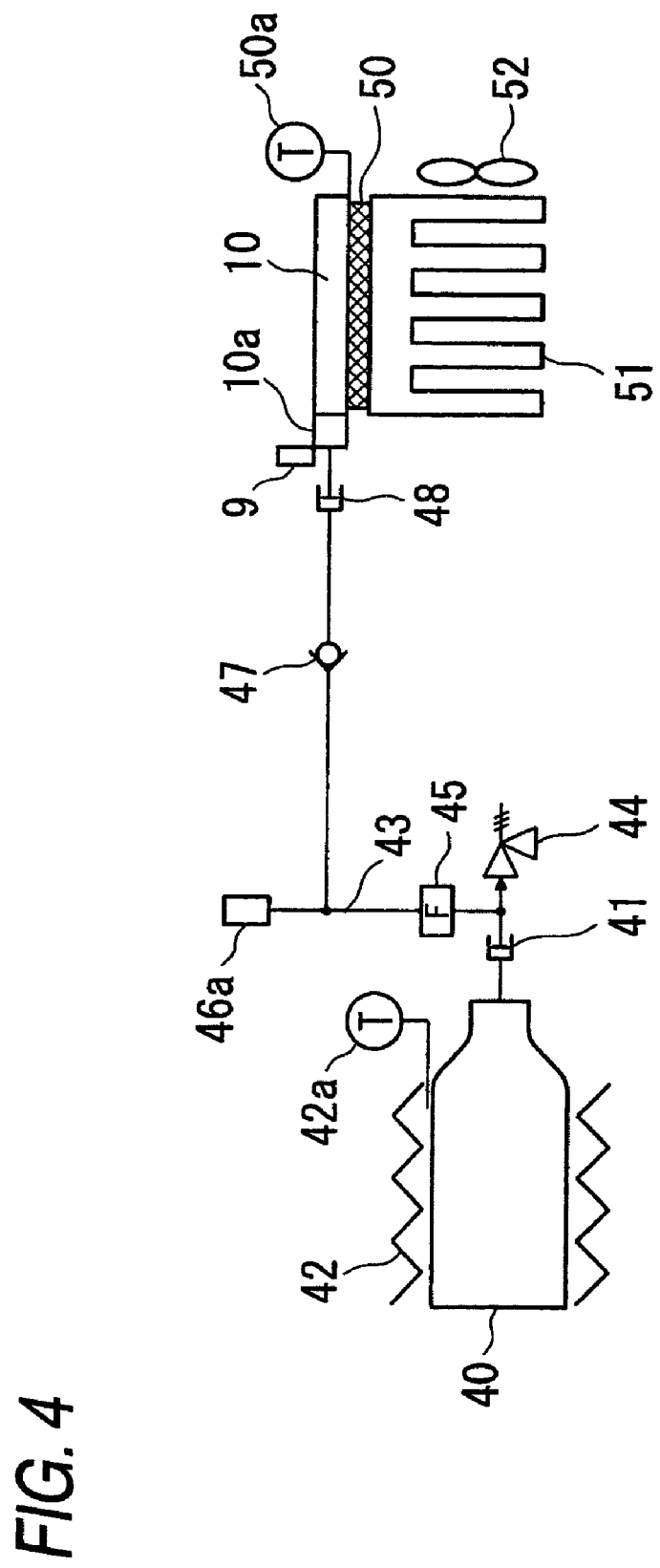
[FIG. 4] A diagram showing an outline of a hydrogen filling apparatus of another embodiment of the invention.

Next, another embodiment will be described based on FIG. 4. In addition, the same numerals are assigned to components similar to those of the embodiment described above and its explanation is omitted or simplified.

This second embodiment has a hydrogen storage tank 40 for supply of a throwaway type as a hydrogen source. The hydrogen storage tank 40 for supply supplies hydrogen by absorbing the hydrogen in a hydrogen absorbing alloy (not shown) received inside the tank and heating the hydrogen absorbing alloy. The hydrogen storage tank 40 for supply can fill a container 10 for hydrogen storage with hydrogen plural times (seven times in this embodiment) and when the tank is used up, the tank is recovered by a supplier and is filled with hydrogen and can be supplied again.

A configuration will hereinafter be described.

The hydrogen storage tank 40 for supply is constructed detachably through a connecting port 41 for supply, and a heater 42 for heating the hydrogen storage tank 40 for supply connected to the connecting port 41 for supply is arranged in proximity to the hydrogen storage tank 40 for supply. In addition, when the heater 42 interferes in the case of attaching and detaching the hydrogen storage tank 40 for supply, it may be constructed so that the heater 42 is retractably formed and when the hydrogen storage tank 40 for supply is connected, the heater 42 is retracted and the hydrogen storage tank 40 for supply is connected to the connecting port 41 for supply and then the heater 42 is moved from a retracting position to a heating position automatically or manually. A temperature of the hydrogen storage tank 40 for supply is detected by a temperature sensor 42a and a detection result is outputted to a controller 20 (illustration is omitted in FIG. 4) and heating control of the heater 42 is performed in the controller 20.

A hydrogen supply line 43 is connected to the connecting port 41 for supply, and a relief valve 44 and a filter 45 are interposed in the hydrogen supply line 43. The relief valve 44 relieves a pressure of the hydrogen supply line 43 to the outside when the pressure of the hydrogen supply line 43 becomes excessive. Also, the filter 45 removes impurities flowing through the hydrogen supply line 43.

A check valve 47 is interposed in the hydrogen supply line 43 and a connecting port 48 is connected to its downstream side and the hydrogen storage container 10 can be connected to the connecting port 48 detachably through a coupler 10a.

Also, a Peltier device 50 for cooling or heating the hydrogen storage container 10 is arranged so as to be proximate to the hydrogen storage container 10 connected to the connecting port 48. In addition, when the Peltier device 50 interferes in the case of attaching and detaching the hydrogen storage container 10, it may be constructed so that the Peltier device 50 is retractably formed and the hydrogen storage container 10 is connected to the connecting port 48 and then the Peltier device 50 is moved from a retracting position to a cooling position automatically or manually. A temperature of the hydrogen storage container 10 is detected by a temperature sensor 50a and a detection result is outputted to the controller 20 and energization control of the Peltier device 50 is performed in the controller 20. In the other surface side of the Peltier device 50, a heat exchange plate 51 is arranged and a fan 52 for blowing air to the heat exchange plate 51 and improving heat exchanger effectiveness is arranged.

Next, an action of a hydrogen filling apparatus in the second embodiment will be described.

By the controller 20, the heater 42 is controlled and a pressure of the hydrogen storage tank 40 for supply is regulated and the pressure is controlled so that a pressure detected by a pressure sensor 46a does not exceed a set value. Thereafter, the hydrogen storage container 10 for performing filling is manually attached to the connecting port 48 through the coupler 10a.

When a pressure of the inside of the hydrogen storage container 10 is lower than a pressure of the hydrogen tank 40, the hydrogen storage container 10 is filled with hydrogen. When the pressure of the inside of the hydrogen storage container 10 is higher than or equal to the pressure of the hydrogen tank 40, filling of hydrogen is stopped by the check valve 47.

After filling of hydrogen is started, it is counted by a timer (not shown) and when a set time has elapsed, the controller 20 determines that it fills up, and an action of the heater 42 with respect to the hydrogen storage tank 40 for supply is stopped and a filling completion lamp is turned on. Also, the controller 20 stops an action of the fan 52 and energization of the Peltier device 50. Therefore, in this embodiment, a fill-up detection unit is constructed by the timer and the controller 20.

An operator manually turns off a main power source switch present in a manipulation and display part 21 (illustration is omitted in FIG. 4) by checking a fill-up. The hydrogen storage container 10 in which filling is completed is detached from the connecting port 48 by the operator and is used.

(Third Embodiment)

In the second embodiment described above, the Peltier device 50 is used in cooling of the hydrogen storage container 10. In this third embodiment, heat dissipation of a Peltier device is used in the hydrogen supply side in the case of cooling a hydrogen storage container 10 by the Peltier device. In addition, the same numerals are assigned to components similar to those of each of the embodiments described above and its explanation is omitted or simplified.

In this embodiment, a high-pressure cylinder 60, a hydrogen generator 61, etc. are used as a hydrogen source and a hydrogen supply line 62 is connected to this hydrogen source and a check valve 64 and an electromagnetic valve 63 for filling are interposed in the hydrogen supply line 62 and further, a pressure sensor 65 for detecting a pressure of the inside of the hydrogen supply line 62 is connected. In the hydrogen supply line 62, a hydrogen buffer line 630 is branched and in the downstream side of a branch part, a check valve 66 is interposed and a connecting port 67 is connected. A relief valve 630a and a filter 630b are interposed in the hydrogen buffer line 630 and a connecting port 630c for buffer is connected to the end of the hydrogen buffer line 630 and a hydrogen storage tank 68 for buffer can be connected to the connecting port 630c for buffer. When a pressure of the inside of the buffer line 630 is excessive, the relief valve 630a relieves the pressure to the outside and impurities etc. flowing through the buffer line 630 are removed by the filter 630b. In addition, a hydrogen absorbing alloy is received inside the hydrogen storage tank 68 for buffer and hydrogen can be absorbed and desorbed.

The hydrogen storage container 10 can be detachably connected to the connecting port 67 described above, and a Peltier device 50 is arranged so that one surface side of the Peltier device 50 is proximate to the connected hydrogen storage container 10 and the other surface side of the Peltier device 50 is proximate to the hydrogen storage tank 68 for buffer. In addition, the proximity described above may be proximity through a heat exchange part etc.

Concretely, in the surface side different from the side of the hydrogen storage container 10 of the Peltier device 50, a heat exchange part 51 is disposed and a fan 52 for promoting heat exchange in the heat exchange part 51 is disposed.

Next, an action of this embodiment will be described.

In this embodiment, in filling of the hydrogen storage container 10 with hydrogen, hydrogen is not supplied from the hydrogen source to the hydrogen storage container directly, and hydrogen is supplied from the hydrogen storage tank 68 for buffer to the hydrogen storage container 10 after the hydrogen is once accumulated in the hydrogen storage tank 68 for buffer.

Figure 5:
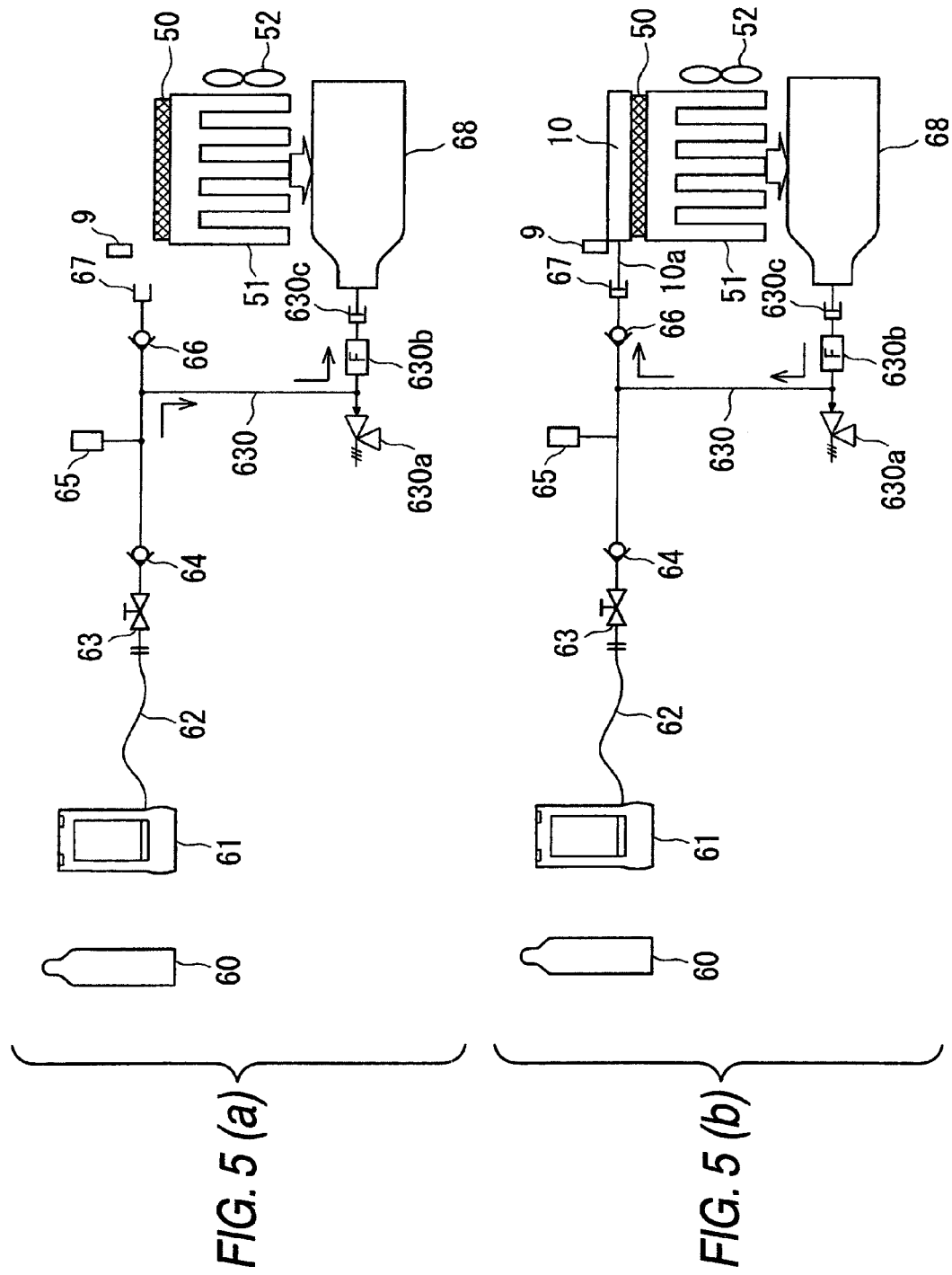
[FIG. 5] A diagram showing an outline of a hydrogen filling apparatus of a further embodiment of the invention.

That is, the electromagnetic valve 63 for filling is first opened and hydrogen supplied from the hydrogen source such as the high-pressure cylinder 60 or the hydrogen generator 61 is moved from the hydrogen supply line 62 to the buffer line 630 and the hydrogen is temporarily accumulated inside the hydrogen storage tank 68 for buffer through the connecting port 630c for buffer (FIG. 5(a)). In this case, the side of the hydrogen storage tank 68 for buffer is cooled by the Peltier device 50. This cooling heat is transmitted to the hydrogen storage tank 68 for buffer through the heat exchange plate 51 and the hydrogen storage tank 68 for buffer is cooled and absorption efficiency of hydrogen improves. In this case, the fan 52 is used.

After hydrogen is accumulated in the hydrogen storage tank 68 for buffer, the hydrogen storage container 10 is connected to the connecting port 67 and filling with hydrogen is prepared. In the filling with hydrogen, the electromagnetic valve 63 for filling is closed and the hydrogen storage container 10 is cooled by the Peltier device 50 and on the other hand, the fan 52 is operated in the heat dissipation side of the Peltier device 50 and the hydrogen storage tank 68 for buffer is heated through the heat exchange plate 51. Then, the hydrogen accumulated in the hydrogen storage tank 68 for buffer is desorbed and flows to the downstream side of the hydrogen supply line 62 through the buffer line 630 and the hydrogen storage container 10 is filled with the hydrogen through the connecting port 67. In this case, the hydrogen storage container 10 is cooled by the Peltier device 50 as described above and energy efficiency at the time of hydrogen absorption (filling) improves and a device occupation area also reduces.

In a manner similar to the embodiments described above, fill-up detection of hydrogen can be performed and the hydrogen storage container is simply filled with hydrogen.

The invention has been described above based on the embodiments, but the invention is not limited to the contents of the embodiments, and it is apparent to those skilled in the art that proper changes can be made without departing from the invention.

In addition, the present application is based on Japanese patent application (patent application No. 2007-026998) filed on Feb. 6, 2007, and the contents of the patent application are hereby incorporated by reference.

Industrial Applicability

The invention comprises a hydrogen source, a detachable connecting port to which a hydrogen storage container is connected in order to store hydrogen supplied from the hydrogen source, a container cooling unit (an air blower) for cooling a hydrogen storage container connected to the connecting port, a container connection recognition unit (a limit switch, a controller) for recognizing connection of a hydrogen storage container to the connecting port, and a fill-up detection unit (a pressure transmitter, a hydrogen remaining sensor, a controller) for detecting that the hydrogen storage container connected to the connecting port is filled up with hydrogen. Consequently, it contributes to simple and safe hydrogen filling in the general public.

The invention claimed is:

1. A hydrogen filling apparatus comprising:
    a hydrogen source;
    a detachable connecting port to which a hydrogen storage container is connected to store hydrogen supplied from the hydrogen source;
    a container cooling unit for cooling a hydrogen storage container connected to the connecting port;
    a container connection recognition unit for recognizing connection of a hydrogen storage container to the connecting port;
    a fill-up detection unit for detecting that the hydrogen storage container connected to the connecting port is filled up with hydrogen; and
    an apparatus cover that covers the connecting port, the apparatus cover including an air introduction port and an air discharge port disposed in a higher position than the air introduction port, wherein the connecting port is disposed proximate to an air path formed from the air introduction port to the air discharge port; and
    an air introduction machine for forcedly introducing air into the air introduction port.

2. The hydrogen filling apparatus according to claim 1, further comprising:
    a hydrogen filling control unit for supplying and filling the hydrogen storage container with hydrogen from the hydrogen source after recognition of the connection by the connection recognition unit and for completing supply and filling with the hydrogen according to fill-up detection by the fill-up detection unit.

3. The hydrogen filling apparatus according to claim 2, wherein the hydrogen filling control unit controls the container cooling unit to cool a hydrogen storage container supplied and filled with hydrogen.

4. The hydrogen filling apparatus according to claim 1, wherein the hydrogen storage container is connected to the connecting port, arrangeable in the air path such that the hydrogen storage container is cooled by air flowing through the air path.

5. The hydrogen filling apparatus according to claim 1,
wherein the fill-up detection unit detects a flow rate or a pressure or both of the flow rate and the pressure of hydrogen with which the hydrogen storage container is supplied and filled and calculates a hydrogen filling ratio of the inside of the container based on the detection result.

6. The hydrogen filling apparatus according to claim 1,
wherein the fill-up detection unit detects a fill-up based on a detection result of a hydrogen remaining sensor for detecting the remaining amount of hydrogen of the inside of the hydrogen storage container.

7. The hydrogen filling apparatus according to claim 1,
wherein the container cooling unit comprises a cooling tube in which a refrigerant flows and heat exchange with the hydrogen storage container is conducted.

8. The hydrogen filling apparatus according to claim 1, further comprising:
a hydrogen tank in the hydrogen source; and
a Peltier device for cooling the hydrogen storage container by the heat absorption side and heating the hydrogen tank by the heat dissipation side in the case of supplying hydrogen from the hydrogen tank.

9. The hydrogen filling apparatus according to claim 1,
wherein a charging hole for charging the hydrogen storage container is disposed in an apparatus body comprising the connecting port, and the charging hole has a shape in which the periphery of the hydrogen storage container is surrounded through a small gap, and
wherein an outer peripheral surface of the hydrogen storage container and an inner peripheral surface of the charging hole have concave and convex shapes for positioning in which any one of the peripheral surfaces or the respective peripheral surfaces engage mutually and the hydrogen storage container is positioned so as to have a small gap between the charging hole and the hydrogen storage container over substantially the whole periphery.

* * * * *